US009609472B2

United States Patent
Turner et al.

(10) Patent No.: US 9,609,472 B2
(45) Date of Patent: Mar. 28, 2017

(54) METHODS AND MOBILE DEVICES TO IMPLEMENT TRAVELER INTERACTIONS AND ACTIVITY TO CHANNELIZE CUSTOMIZED DATA

(71) Applicant: HomeAway.com, Inc., Austin, TX (US)

(72) Inventors: Ryan Hedley Turner, Austin, TX (US); Daniel Steven Haligas, Panama City, FL (US); Velayudhan Pillai Venugopal, Austin, TX (US); Alex Holm Devine, Austin, TX (US)

(73) Assignee: HomeAway.com, Inc., Austin, TX (US)

( * ) Notice: Subject to any disclaimer, the term of this patent is extended or adjusted under 35 U.S.C. 154(b) by 0 days.

(21) Appl. No.: 14/564,073

(22) Filed: Dec. 8, 2014

(65) Prior Publication Data

US 2016/0165388 A1 Jun. 9, 2016

(51) Int. Cl.
*H04W 4/02* (2009.01)
*G06Q 30/02* (2012.01)

(52) U.S. Cl.
CPC .......... *H04W 4/02* (2013.01); *G06Q 30/0261* (2013.01); *G06Q 30/0267* (2013.01)

(58) Field of Classification Search
USPC .......... 455/456.1, 456.2, 456.3, 457
See application file for complete search history.

(56) References Cited

U.S. PATENT DOCUMENTS

2009/0319177 A1* 12/2009 Khosravy .......... G06Q 30/0241
701/408

* cited by examiner

*Primary Examiner* — Sayed T Zewari
(74) *Attorney, Agent, or Firm* — Knobbe, Martens, Olson & Bear, LLP (57) ABSTRACT

Various embodiments relate generally to electrical and electronic hardware, computer software, wired and wireless network communications, and wearable computing devices for identifying activities and/or destinations of relative importance. More specifically, a system, a device and a method are provided to determine interactions at a mobile computing device predict activities based on one or more types of interactions. Examples of activities include preferential activities available at a geographic region association with lodging In one or more embodiments, a method can include receiving data representing an interaction with a user interface, generating data summarizing the interaction to include an interaction type, and determining data representing a prioritized value indicative of a degree of the interaction. The method also may include predicting participation in an activity as a function of the prioritized value, and generating customized advisory data based on prioritized values of one or more interaction types.

15 Claims, 5 Drawing Sheets

METHODS AND MOBILE DEVICES TO IMPLEMENT TRAVELER INTERACTIONS AND ACTIVITY TO CHANNELIZE CUSTOMIZED DATA

CO-RELATED APPLICATIONS

U.S. patent application Ser. No. 14/562,629 filed on Dec. 5, 2014, entitled "Adaptive Advisory Engine and Methods to Predict Preferential Activities Available at a Region Associated with Lodging," is herein incorporated by reference.

FIELD

Various embodiments relate generally to electrical and electronic hardware, computer software, wired and wireless network communications, and wearable computing devices for identifying activities and/or destinations of relative importance. More specifically, a system, a device and a method are provided to determine interactions at a mobile computing device predict activities based on one or more types of interactions. Examples of activities include preferential activities available at a geographic region association with lodging.

BACKGROUND

A number of conventional techniques have been developed to support implementations of various vacation rental marketplaces in which disparate owners of second or vacation homes can rent personal property to temporary travelers, such as vacationers and is travelers. In a vacation rental marketplace, a family or a group of people (e.g., group of friends) may rent anything from cabins, condominiums, summer homes, to villas, barns, farm houses, and castles. These types of rental properties are desirable as typical hotel or motel buildings are not well-suited to accommodate families or groups of people, and are usually less private and less comforting to some guests.

With the advent of networked computing devices, facilitating the renting of properties electronically has enabled travelers to more readily enjoy the experiences of renting others' homes. However, conventional techniques and known technological solutions have been sub-optimal in guiding or navigating travelers to desired activities. Further, conventional computing devices in traditional vacation rental marketplaces are not well-suited to provide sufficient information to travelers regarding activities in a local in which a rental property is located. For example, data systems for various proprietor wars and/or providers of goods and services in a geographic location are independently operated and generally lack interconnections to enable travelers access to a sufficient information to fully determine activities in which a traveler may participate. Another drawback to conventional rental marketplaces is that computer implementations of concierge-like services for guests may be somewhat limited or negligible due to the lack of computing and/or administrative resources. As such, a travel experience for a traveler generally is suboptimal as conventional systems usually do not provide for real-time modification of information provided about activities of interest to a user.

While conventional approaches are functional, the usual structures and/or functionalities for renting properties are not well-suitable to the increasing technological demands required to optimally guide and/or service the predilections of travelers effectively, including during a traveler's stay.

Thus, what is needed is a solution for channelizing a participant to desired activities in association with a computerized rental system effectively without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
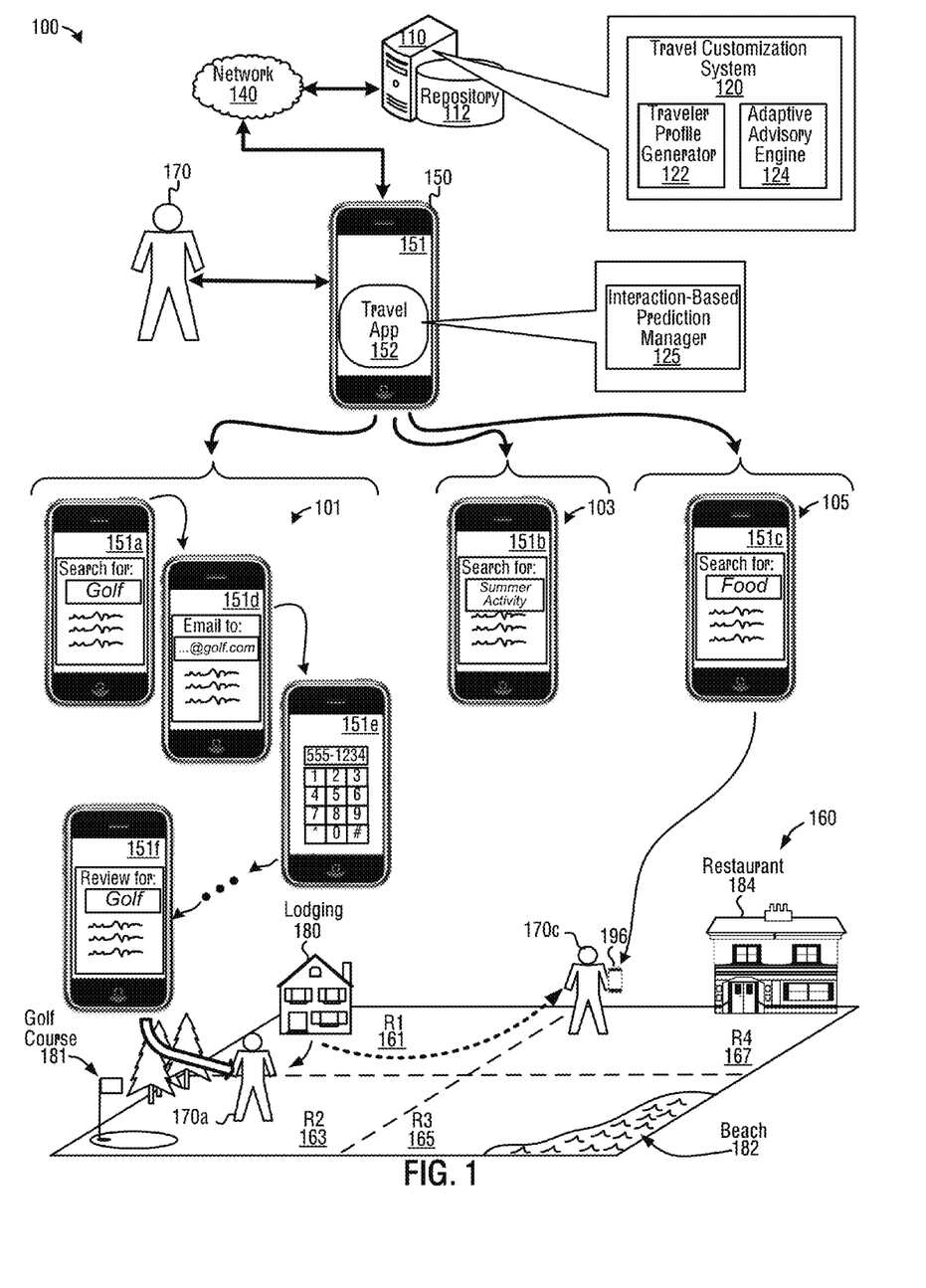
FIG. 1 is a diagram depicting an interaction-based predictions manager, according to some embodiments.

FIG. 1 is a diagram depicting an interaction-based predictions manager, according to some embodiments. Diagram 100 includes an interaction-based prediction manager 125, or a portion thereof, disposed in a travel application ("app") 152 implemented in a mobile computing device 150, which includes an interface (e.g., a user interface 151). Interaction-based prediction manager 125 is configured to detect interactions with interface 151, for example, by inputs provided by user/traveler 170. Further, interaction-based prediction manager 125 is configured to characterize an interaction as an interaction type, which, in turn, may be assigned a priority by interaction-based prediction manager 125 that is indicative of a level of interest to traveler 170 in participating in a particular activity within a geographic location that includes lodging for user 170. As such, interaction-based prediction manager 125 may independently (e.g., with minimal or negligible data from other sources, such as from travel customization system 120) determine preferable activities in which traveler 170 desires to engage. Therefore, mobile computing device 150 may have less than an optimal communications link with external sources (e.g., to travel customization system 120), and may use on-board circuitry and/or logic to implement the functions of interaction-based prediction manager 125.

Examples of interaction types that interaction-based prediction manager 125 determines includes whether an interaction includes one or more of a search the search engine (e.g., using a browser application), a transmission of an email with or without the reply thereto (e.g., using an email application), a transmission of a telephonic text message with or without the reply thereto (e.g., using text message application, such as for SMS text messages), a transmission of voice data, such as during a telephone call, to a callee telephone number associated with a destination at which a preferential activity may be performed, location data received during one or more durations of time during which mobile computing device 150 (e.g., and presumably user 170) coincide with the location coordinates associated with a location at which an activity may be performed, and a transmission of an electronic message or other electronic interactions to provide data representing a review of an experienced by user 170 of an activity, as well as other interactions and interaction types.

Further, interaction-based prediction manager 125 may associate different values to the above-described interaction types respectively. In some cases, interaction-prediction manager 125 describes a lower prioritized value for performing a search, as described above, to a highest prioritized value of submitting a review, as described above. Further, the order of the above-described interaction types may be associated with increasing prioritize values ranging from a lowest prioritized value for performing a search to a highest prioritized value of submitting a review. In some cases, the prioritized values associated with an interaction type may be indicative of the level of interest by user 170 (or a predicted probability that a user 170 is interested). Therefore, interaction-based prediction manager 125 can use detected interaction types and the corresponding prioritize values to predict an activity or event, including a location, that is of interest to a user during a stay at a rented home or other temporary lodging secured via travel customization system 120.

In some examples, interaction-based prediction manager 125 may be configured to use data from, or otherwise cooperate with, a travel customization system 120. An example of a travel customization system 1720 includes a platform configured to manage rental of properties, such as provided by HomeAway, Inc., of Austin, Tex. In some examples, travel customization system 120, or portions thereof, may be implemented in the examples described in U.S. patent application Ser. No. 14/562,629 filed on Dec. 5, 2014, entitled "Adaptive Advisory Engine and Methods to Predict Preferential Activities Available at a Region Associated with Lodging," is herein incorporated by reference. Travel customization system 120 may be configured to, among other things, to predict preferential activities in which a user may wish to engage. As such, travel customization system 120 can convey to a user real-time data (or near real-time data) that is customized to the traveler based on, for example, one or more attributes of the traveler. In some examples, the functions of travel customization system 120 may be satisfied by interaction-based prediction manager 125. That is, interaction-based prediction manager 125 may perform equivalent or substantially equivalent functions of travel customization system 120 during periods of time, for example, in which a network connection through network 140 to travel customization system 120 is not available.

Further, travel customization system 120 may be further configured to navigate the user to (or cause the user to participate or engage in) one or more activities or destinations at geographical region 160, which may include lodging 180 at which the user is staying temporarily—whether for business or vacation. As shown, travel customization system 120 includes a traveler profile generator 122 and an adaptive advisory engine 124, either or both of which can be implemented in hardware, software, or a combination thereof. In this example, travel customization system 120 may be implemented as a computing device 110, which may include processors, logic, and other hardware, and a data repository 112, which may include executable instructions in firmware, software, or the like. Travel customization system 120 may also be configured to provide a secure, private network of computing devices that is accessible by its travelers' authorized computing devices as well as other privileged computing devices that may host or otherwise facilitate activities of interest.

Traveler profile generator 122 may be configured to generate or otherwise provide traveler profile data associated with a user, the traveler profile data including various data types specifying associated traveler attributes. Travel customization system 120 may use traveler attributes, which may be described by a traveler profile data, to predict a preferred activity in which a user may wish to engage at geographic location 160. Traveler profile data generated by traveler profile generator 122 can include, for example, personal data describing a traveler and trip data as travel attributes. Examples of personal data may include demographic information, such as name, address, marital status, age, gender, presence of children, a dwelling type (e.g., a type and size of a residential house), a range of income, and the like. Examples of trip data includes data indicating types of trips taken (e.g., business trip, vacation, etc.) and pointer or link data associating a trip to other travel attributes for specific destination (e.g., associating a vacation with a spouse, children, types of activities, meal types, types of lodging, etc., which may be used to predict a preferential activity).

Further, traveler attributes may describe companion types of individuals that may accompany a traveler, such as family members, friends, colleagues, and other data types that describe other companions, such as clients, government officials, tour guides, etc., as travel attributes. Examples of family data (as travel attribute data) include data representing one or more members of the family, each member of the family represented by data indicating a familial relationship, and other travel-related attributes (e.g., whether a child or spouse accompanied a traveler on a trip, and if so, whether the family member also accompanied the traveler to specific activities). Friend data and colleague data (as travel attribute data) may include similar data. As an example, friend data may include a subset of friends, all of whom are female, tend to accompany each other once a year to Las Vegas, to a winery, or to a spa. As such, friend data for the group of friends may be associated with destinations that may predict a next trip as "a girls' (or guys') getaway weekend" trip and related activities. Similarly, colleague data may include different subsets of colleagues, each subset being associated with visiting or traveling to a different client. As such, such travel-related attributes may be used to remind a traveler of certain activities preferred by a certain client, based on the subset of colleagues who are traveling with the traveler.

Further, traveler profile generator 122 may also generate traveler profile data that includes lodging data, meal data, and activity data, any or all of which may constitute at least a portion of traveler attribute data. Examples of lodging data include data representing characteristics of various lodging accommodations associated with a traveler, such as a type of lodging (e.g., a house, condo, a cabin, etc.), a number of bedrooms, a presence of the kitchenette, whether in walking distance of local attractions, whether pets are permitted, etc. Examples of meal data include types of restaurants (e.g., family-friendly, fine dining, etc.), types of cuisine, hours of operation, relative distance or location to a lodging, etc. Examples of activity data include data representing activities, such as surfing, snorkeling, golfing, boat or Jet Ski rental, fishing, working out, fitness training, running paths, horseback riding, cycling, etc., as well as data representing participation in events, such as weddings, carnivals, regattas, fishing tournaments, poker championships, holiday festivities, etc. According to some examples, travel attribute data may also include similar data for other travelers, as well as data representing an aggregation of travelers (e.g., stored in an anonymized manner).

Adaptive advisory engine 124 can, among other things, may influence the direction of movement of a traveler within geographical region 160 to a destination at which the traveler may participate in a preferred activity. In some embodiments, the functionality of adaptive advisory engine 124 may be implemented as a portion of interaction-based prediction manager 125. Further, adaptive advisory engine 124 may generate customized advisory data for transmission via network 140 to mobile computing device 150. In some cases, a representation of customized advisory data may be displayed on a user interface 151 of mobile computing device 150, or otherwise may be configured to influence the computations of an electronic map or route generator based on at least predicted activities derived from travel attributes (e.g., as implemented in a mapping application executed on mobile computing device 150).

To illustrate an example of adaptive advisory engine 124, consider that traveler attribute data (including past and/or present acquired data) is accessed during a visit to geographic location 160. As shown, a traveler (e.g., the user) is staying at lodging 180, which is disposed in first region 161 of geographic region 160. In one example, traveler 170 may shares a cab from an airport to lodging 180 during which the identities of colleagues 172 are identified, and, thus, adaptive advisory engine 124 may predict that traveler 170 is on a business trip, and if so, adaptive advisory engine 124 may further predict that golf may be a preferred activity in which to participate during the stay for user/traveler 170 (e.g., should the weather permit). As such, customized advisory data can be transmitted to mobile computing device 150 to recommend or otherwise influence traveler 170 to travel to a golf course 181 as traveler 170a to participate in a round of golf.

To illustrate operation of interaction-based prediction manager 125, consider that data representing one or more interactions with user interface 151 of mobile computing device 150 is received by interaction-based prediction manager 125. Consider a first example in which a user interacts with an interface 151b of mobile computing device 103 (e.g., which may be the same as mobile computing device 150 at a different point in time). As shown, traveler 170 may interact with user interface 151b to perform a search for a "summer activity" with which traveler 170 may enjoy with their family. Data sources, such as external-data sources, may provide electronic messages and/or information (e.g., from a search engine application executed on a remote server) via mobile computing device about a beach 182 located in region ("R3") 165. Such information may include directions, a telephone number for a state park beach, and email address to reserve a spot on the beach, and other such information. Interaction-based prediction manager 125 then may analyze or otherwise monitor interactions to determine whether there are any further interactions related to an activity related to beach 182. If not, user 170 may be presumed to not be that interested in visiting a beach 182 as user 170 that no more than perform a search and stopped without further interactions.

In another example, consider a user interacts with an interface 151c of a mobile computing device 150 (e.g., mobile computing device 150 at various other points in time). As shown, traveler 170 initiates a search for "food," and may receive information and/or an electronic message describing restaurant 184 in region ("R4") 167. In some cases, a prioritized value associated with the search for "food" in this example may be similar to a prioritized value associated with the above described search for "a summer activity." But next consider that traveler 170 walks a distance from region 161 as traveler 170c to view a menu in front of the door of restaurant 184. As traveler 170 carries mobile computing device 150, as a computer device 196, location data may be received by interaction-based prediction manager 125 that the location of the user 170c coincided with the location of restaurant 184, albeit for less time than participating in an activity (i.e., less time than usual to consume a meal). Regardless, a prioritized value for an interaction (e.g., a passive interaction) of walking to restaurant 184 may be associated with higher prioritized value than just searching for food or a restaurant. Further, in view of the two above-described examples, interaction-based prediction manager 125 and/or adaptive advisory engine 124 may be configured to modify, for example, search results in favor of "food" over "summer activities" based on a higher calculated level of interest for finding a restaurant over going to a beach, based on interactions.

In yet another example, consider user interacts with an interface 151a of a mobile computing device 101 to search for activities relating to "golf." As such, interaction-based prediction manager 125 may assign a prioritized value similar to the previous-described interactions relating to searches. But next consider traveler 170 causes an email via interface 151d to be sent to an entity associated with a destination (e.g., Bluebonnet Hill Golf Course). In some examples, performing an email inquiry may have a higher prioritized value, as an interaction, then performing a search for the same. Next consider that traveler 170 uses interface 151e to make a phone call to an entity associated with golf course 181. Further still, interaction-based prediction manager 125 may assign the interaction of making a phone call has a higher prioritized value then sending an email. Further to this example, consider that traveler 170c visits the golf course 181 in region ("R2") 163, and plays a round of golf (e.g., location coordinates remain relatively coterminous with a boundary of golf course 181 during a period of time that typically takes to play 9 or 18 holes of golf). As such, interaction-based prediction manager 125 may assign higher prioritized value for interaction (e.g., playing golf or otherwise engaging in activity) that the previously-described interactions. Next, user 170a may generate a review using interface 151f of mobile computing device 101. In this case, the user has participated in an activity, and is so engaged with either the positive and/or negative aspects of the activity, they take the time to write a review. In some cases, submitting a review via electronic communications link may be associated with a prioritized value that is higher than the precisely-described interactions.

Figure 2:
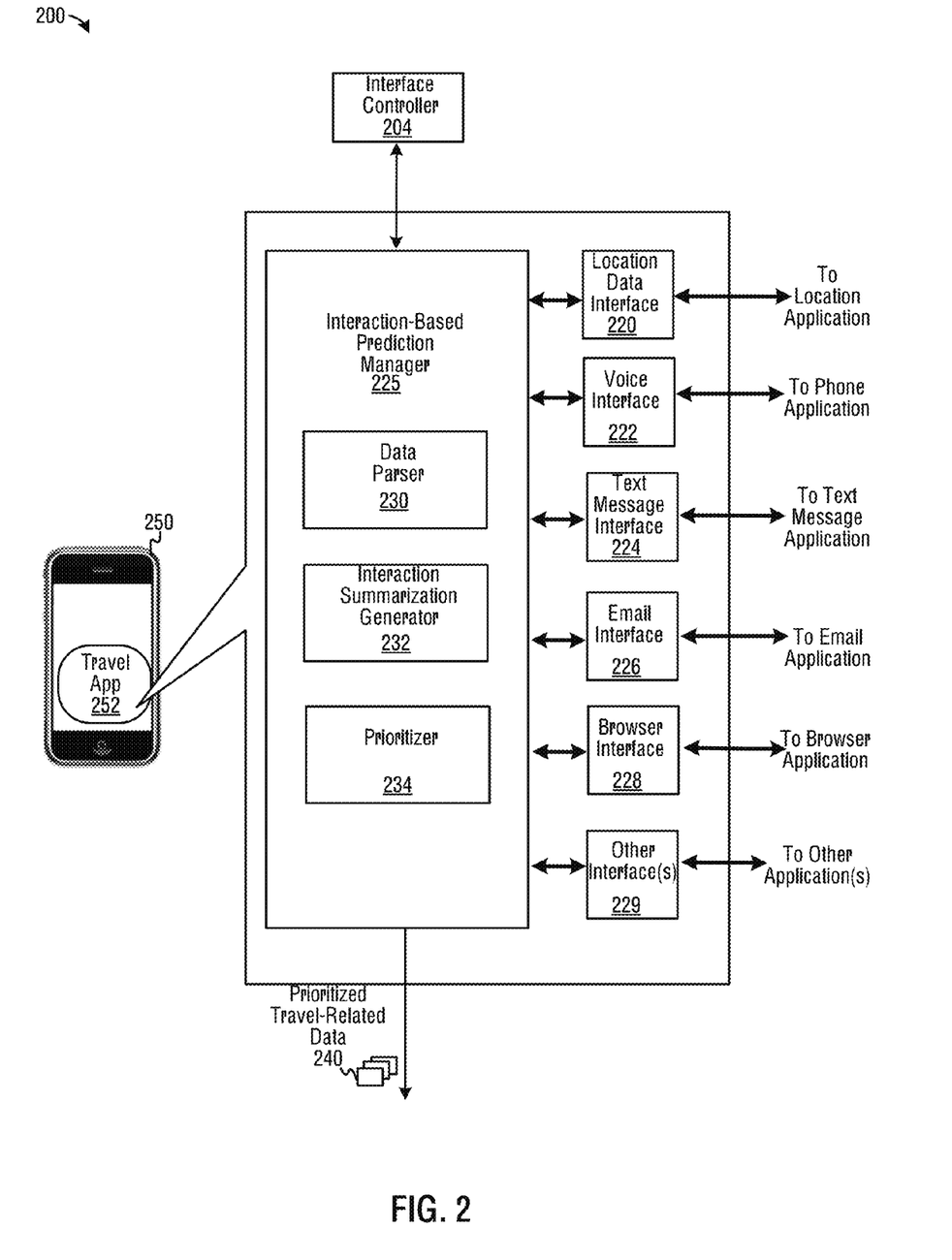
FIG. 2 is a diagram depicting an interaction-based prediction manager, according to some embodiments.

FIG. 2 is a diagram depicting an interaction-based prediction manager, according to some embodiments. Diagram 200 depicts an interaction-based prediction manager 225 including a data parser 230 configured to parse and extract data representations of an activity-of-interest to a user, and interaction summarization generator 232 configured to characterize and/or summarize a context of interaction as well as the interaction, and a prioritize 234 configured to assign a prioritized value to data representing interaction, and further configured to associate or include data values representing an interaction type (e.g., as described above, from performing searches and to submitting reviews), location data representing a location, one or more timestamps indicating a time frame, and data representing an activity or event associated with one or more interactions. Interaction-based prediction manager 225 is configured to generate prioritized travel-related data 240, which embodies data representations (e.g., prioritize values) for different levels of interests to a user for different activities/events.

In some examples, an interface controller 204 can receive data indicating user inputs at a user interface, whereby the user inputs may be associated with one or more commands to initiate one or more functionalities of interaction-based prediction manager 225. Further, interaction-based prediction manager 225 may be coupled via one or more interfaces to various applications and/or data sources. In this example, interaction-based prediction manager 225 is coupled to a location data interface 220 that is configured to receive location coordinates, such as GPS coordinates (or the like), from a location application such as an GPS application disposed on or in mobile communications device 250 and/or a travel application 252, which may include interaction-based prediction manager 225. Also, interaction-based prediction manager 225 may be coupled to a voice interface 222 that interfaces with a phone application (e.g., a telephone application) configured to facilitate telephone calls. Interaction-based prediction manager 225 may be coupled to a text message interface 224 configured to facilitate text messaging (e.g., SMS text messages) with a text message application. Interaction-based prediction manager 225 may be coupled to an email interface 226 configured to facilitate email messaging via an email application. Also, interaction-based prediction manager 225 may be coupled to a browser interface 220 configured to access a browser application. Browser interface 220 may be configured to facilitate searching via a search engine and submission of reviews in remote server, among other things. Other interfaces to 29 may be implemented to access other applications. Note that the above-described interfaces 220, 222, 224, 226, 228, and 229, may be implemented as application programming interfaces, or APIs, according to some embodiments Data parser 230 may be configured to parse, for example, through strings of text to identify and/or tag relevant words, terms, or other symbols relevant to lodging for a user or associated geographic region. For example, information about local activities recommendations may be available to a user via network connection to interaction-based prediction manager 225. A local activity may include playing golf. When a user transmits an electronic message describing an activity of playing golf including location, the name of a golf course, the time of day, and the like, data parser may capture a copy of the out-bound electronic message for parsing and detecting golf-related words or symbols. Further, data parser 230 may be configured to parse in-bound electronic messages or information as well. Data parser 230 may also be configured to receive electronic information responsive to a user interaction, such as data from a search query, and to extract data representing the electronic information. Then, data parser 230 may be configured to parse data representing the electronic information to identify activity-relevant terms to identify the activity based on the activity-relevant terms.

Interaction summarization generator 232 is configured to receive parsed data from data parser 230, as well as data from other sources. Interaction summarization generator 232 is configured to generate data that summarizes an interaction, whereby the summary data describes an interaction type (e.g., the browser search, an email, a text message, a telephone call, a visit to a destination, participation in an activity at the destination, submission out a review of the activity, and the like). Thus, interaction summarization generator 232 may generate data representing an interaction type, which, in turn, includes data specifying one or more of a search the search engine (e.g., using a browser application), a transmission of an email with or without the reply thereto (e.g., using an email application), a transmission of a telephonic text message with or without the reply thereto (e.g., using text message application, such as for SMS text messages), a transmission of voice data, such as during a telephone call, to a callee telephone number associated with a destination at which a preferential activity may be performed, location data received during one or more durations of time during which mobile computing device 250 (e.g., and presumably a corresponding user) coincide with the location coordinates associated with a location at which an activity may be performed, and a transmission of an electronic message or other electronic interactions to provide data representing a review of an experienced by a user of an activity, as well as other interactions and interaction types.

Prioritizer 234 may be configured to determining data representing a prioritized value, which may be indicative of a degree of the interaction based on the interaction type of the interaction. According to various examples, a prioritized value may be assigned by prioritizer 234 based on a particular interaction type, whereby, for example, searching of a term using a search engine—without more—indicates a relatively low level of interest by a user. By contrast, submission of a review indicates a relatively high level of interest by a user in a particular activity. According to some embodiments, a magnitude of a prioritized value may adapted to particular user over time. For example, merely searching for a term for an activity may indicate a high level of interest for rare individual. As such, prioritizer 234 may be configured to adapt its prioritized values responsive to the types of interactions performed by a user that correlate to an interest of the user.

According to some embodiments, a prioritizer 234 may be configured to determine a first subset of interaction types and a second subset of interaction types, whereby the first subset of interaction types are prioritized greater than the second subset of interaction types. In some cases, searching an activity using a search engine, sending an email query, and sending a text message, all of which may be deemed as interactions of low to moderate levels of interest for an user. For instance, prioritizer 234 may prioritize a second subset of interaction types that include transmitting an electronic message (including email and text messages) and/or performing a search of key words associated with the activity via a search engine application as relatively lower values.

Further, in other cases, prioritizer 234 may prioritize a first subset of interaction types (e.g., submitting a review of the participation of the activity, visiting a location at which the activity occurs, and generating a telephone call to a provider of the activity at the location) to have relatively high magnitudes of prioritize values. Note that each of the above described interactions may be ranked relative to each other in the respect of subsets of interaction types. For example, submitting a review may be ranked higher than participating in an activity, whereas participating in an activity may be ranked higher than visiting a location at which the activity occurs, whereas visiting the location at which the activity occurs may be ranked higher than making a telephone call related to the activity.

In some examples, interaction-based prediction manager 225 may be configured to determine a location of an activity, and calculate whether mobile computing device 250 is co-located with a location of an activity. If so, interaction-based prediction manager 225 may be configured to identify a interaction type as "a visit" to the location. In some cases, a ranking value may be assigned to data representing the visit to the location, whereby the ranking value is indicative of a level of priority (e.g., a prioritized value of same).

Interaction summarization generator 232 may be configured to detect data representing another interaction with the user interface, and to determine another prioritized value associated with the other interaction. Also, interaction summarization generator 232 may calculate an accumulated prioritized value based on the prioritized value and the another prioritized value. For example, consider that a user first searches a key term for an activity, and then telephones a location, such as a restaurant, as a result of information retrieved as part of the search result. Both of these interactions and the corresponding prioritize values may be aggregated or otherwise accumulated to indicate an enhanced level of interest. Further, consider the user also participates in an activity at the destination, such as having dinner at, or traveling to, a restaurant. The latter interaction may further bolster a level of interest of a user to engage in a restaurant-based activity. As such, restaurant-based activities may be prioritized higher than other activities to match a particular user's interests and inclinations.

Figure 3:
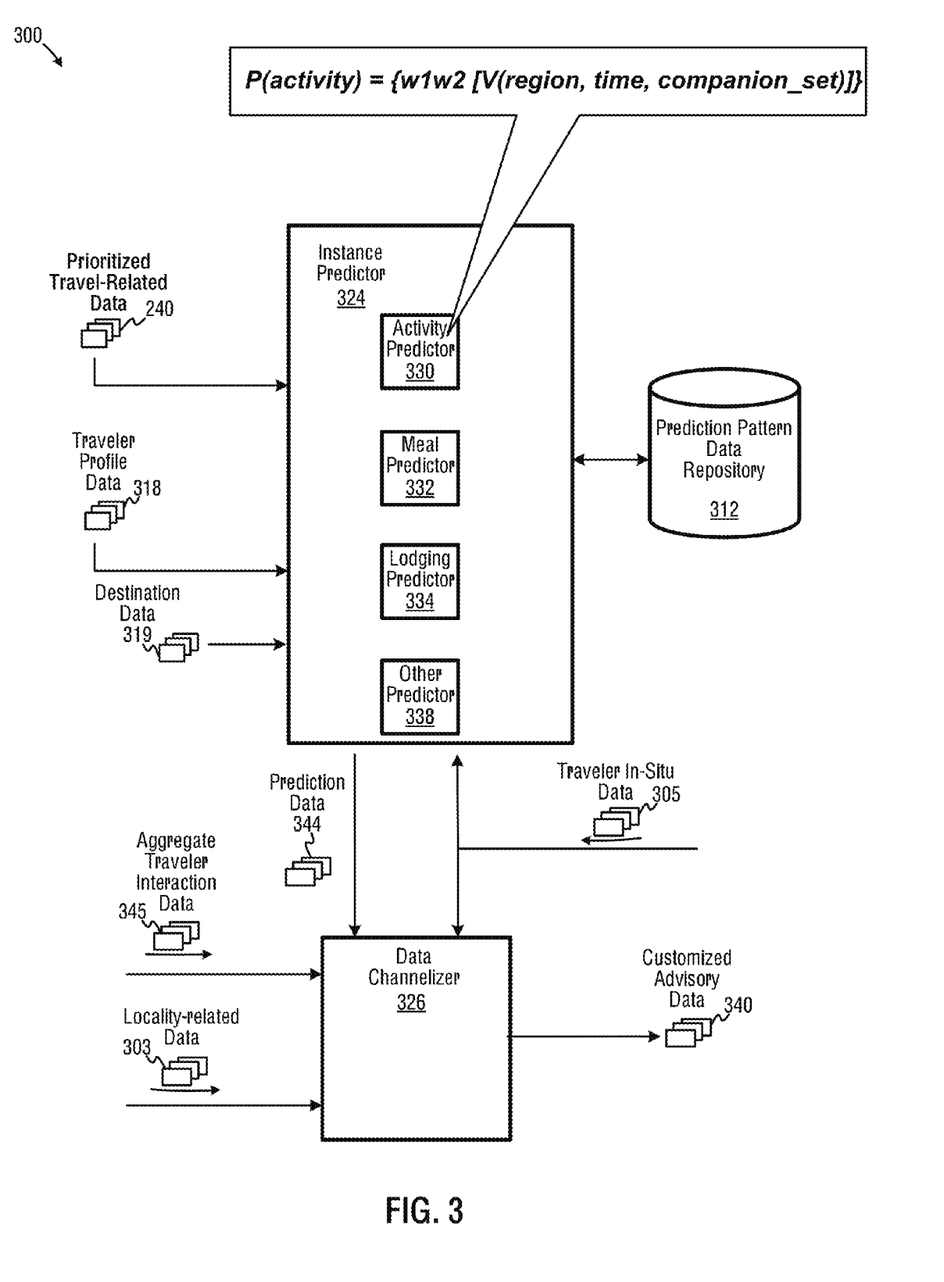
FIG. 3 is a diagram depicting an instance predictor configured to receive prioritized travel-related data from an interaction-based prediction manager, according to some examples.

FIG. 3 is a diagram depicting an instance predictor configured to receive prioritized travel-related data from an interaction-based prediction manager, according to some examples. Diagram 300 depicts an instance predictor 324 configured to receive prioritized travel-related data 240 from, for example, interaction-based prediction manager 225 of FIG. 2. Referring back to FIG. 3, the instance predictor 324 is configured to generate prediction data 344, with which data channelizer 326 uses to generate customized advisory data 340. According to some embodiments, customized advisory data 340 may be locally derived. That is, a mobile computing device may independently (e.g., without a network connection to a travel customization system or platform) determine customize advisory data tailored for preferential activities that may be desired by a particular user.

Instance predictor 324 may be configured to predict participation in an activity as a function of the prioritized value. In some cases, instance predictor 324 may predict participation in an activity based on an accumulated prioritized value (e.g., multiple interactions of a user) and/or maybe based on aggregate traveler interaction data 345, which describes aggregated priorities and prioritize values associated with predominant interactions by other travelers or users.

Data channelizer 326 may be configured to generate customized advisory data configured to cause presentation of a representation on the user interface. The representation may be linked to the customized advisory data to facilitate the participation in the activity. According to some examples, data channelizer 326 may receive data representing aggregated traveler interaction data 345, and channelize the customized advisory data to a specific subset of one or more travelers based on data representing aggregated traveler interaction data. Note that location coordinates for an interaction (and other interactions) may be determined, and information regarding one or more locations may be used to form the customized advisory data.

In some examples, instance predictor 324 and/or data channelizer 326, or portions thereof, may be implemented in accordance with one or more examples described in U.S. patent application Ser. No. 14/562,629 filed on Dec. 5, 2014, entitled "Adaptive Advisory Engine and Methods to Predict Preferential Activities Available at a Region Associated with Lodging," is herein incorporated by reference.

Further, to the example shown, instance predictor 324 may be configured to also receive traveler profile data 318 (e.g., as described in FIG. 1), destination data 319, traveler in-situ data 305, which include other data generated at a mobile device along with interaction types, and data representing a prediction pattern stored in data arrangements in a prediction pattern data repository 312, which may include patterns for determining predictions based on, for example, prioritized values of interaction types. Further, instance predictor 324 may be configured to generate prediction data 344 including, for example, data representing one or more activities predicted as preferential activities for at least one certain traveler. Data channelizer 326 is configured to receive prediction data 344, aggregate traveler in-situ data 345, traveler in-situ data 305, and locality-related data 303 (e.g., local weather conditions and hazard advisories, etc.) for selecting at least one preferential activity to which a traveler may be channelized, according to customized advisory data 340. Note that elements depicted in diagram 300 may include structures and/or functions as similarly-named or similarly-numbered elements of other figures described herein.

According to some examples, instance predictor 324 may include one or more logic modules implemented as activity predictor 330, meal predictor 332, lodging predictor 334, or other predictor 338, including a collaborative predictor configured to predict one or more companions with which to participate in an activity. In the example shown, activity predictor 330 can be configured to determine a probability, "P(activity)," may occur based on at least of value, "V," as a function of, for example, a region, a time frame, and set of companions. In some examples, the value, V, may be derived from prediction patterns indicating greater probabilities based on greater number of sequenced occurrences of activities that constitute a likely activity. For example, the probability of snow skiing may be relatively high in a region including Aspen, Colo., during the winter season, and with a set of companions that ski frequently, whereas the probability of snow skiing may be relatively low in the same region during the month of August (i.e., the summer season). Optionally, the probability of an activity may be determined by one or more weighting factors, such as a weighting factor one ("w1") and a weighting factor two ("w2"). In some cases, weighting factor one can represent a value indicative of a degree of relevancy. In one example, weighting factor two, w2, may represent a prioritized value (or an accumulated/aggregated prioritized value) indicative of a level of interest by a user as determined by a user interaction. Further to the previous snow skiing example, if a person or companions have no record of skiing, then they may be up to view a film festival in Aspen rather than snow skiing. Thus, in their case, the probability of snow skiing may be driven to a relatively low probability by a low weighting value due to an absent record of skiing.

Figure 4:
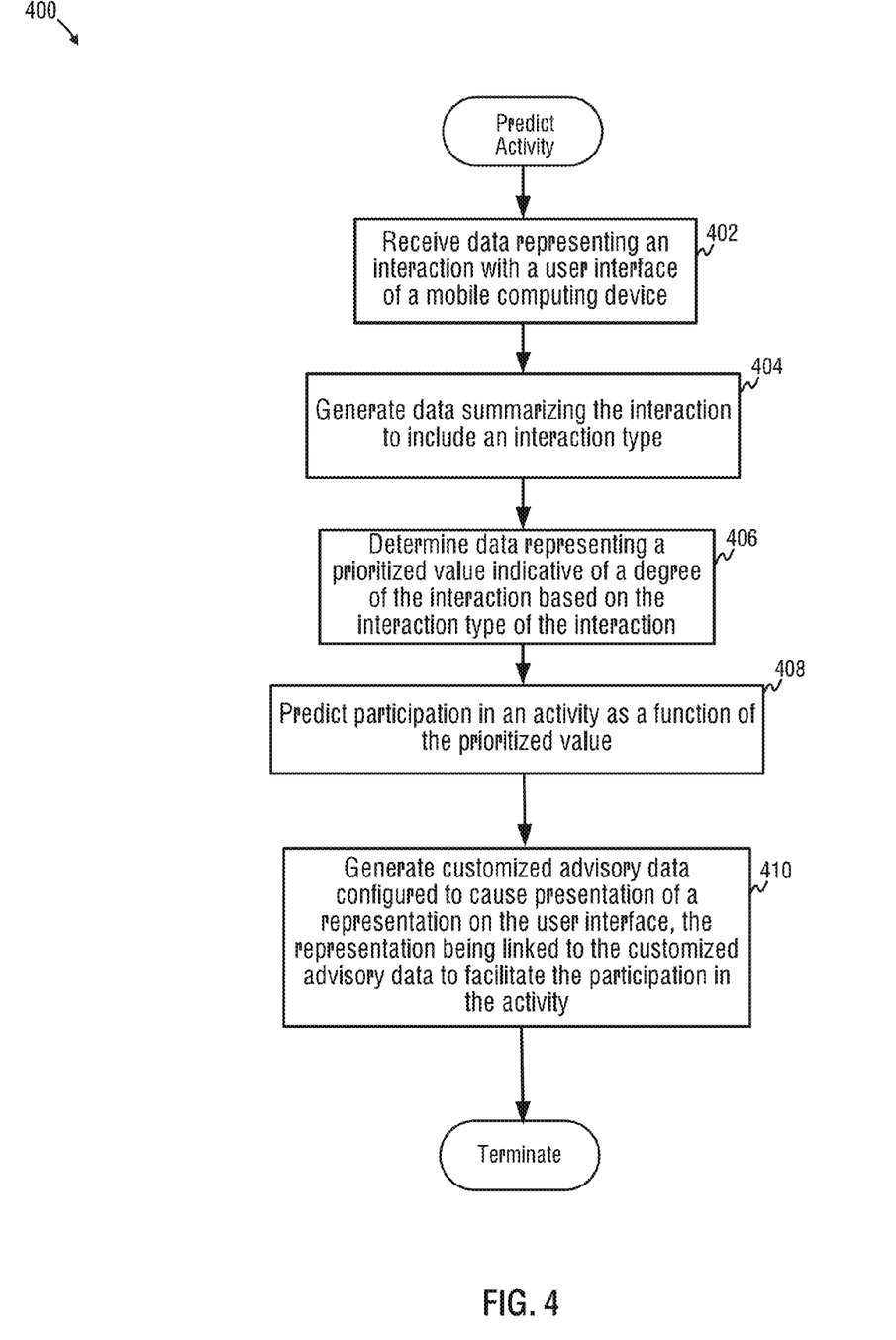
FIG. 4 is an example of a flow diagram to predict an activity, according to some embodiments.

FIG. 4 is an example of a flow diagram to predict an activity, according to some embodiments. At 402, flow 400 causes receipt of data representing an interaction with a user interface of a mobile computing device, and a portion of the data summarizing the interaction to include an interaction type is generated at 404. At 406, data representing a prioritized value indicative of a degree of the interaction may be determined based on the interaction type of the interaction. At 408, participation in an activity (or a preference to engage in the activity) may be predicted as a function of the prioritized value. Next, a customized advisory data may be generated at 410, whereby the customized advisory data may be configured to cause presentation of a representation on the user interface, the representation being linked to the customized advisory data to facilitate the participation in the activity.

Figure 5:
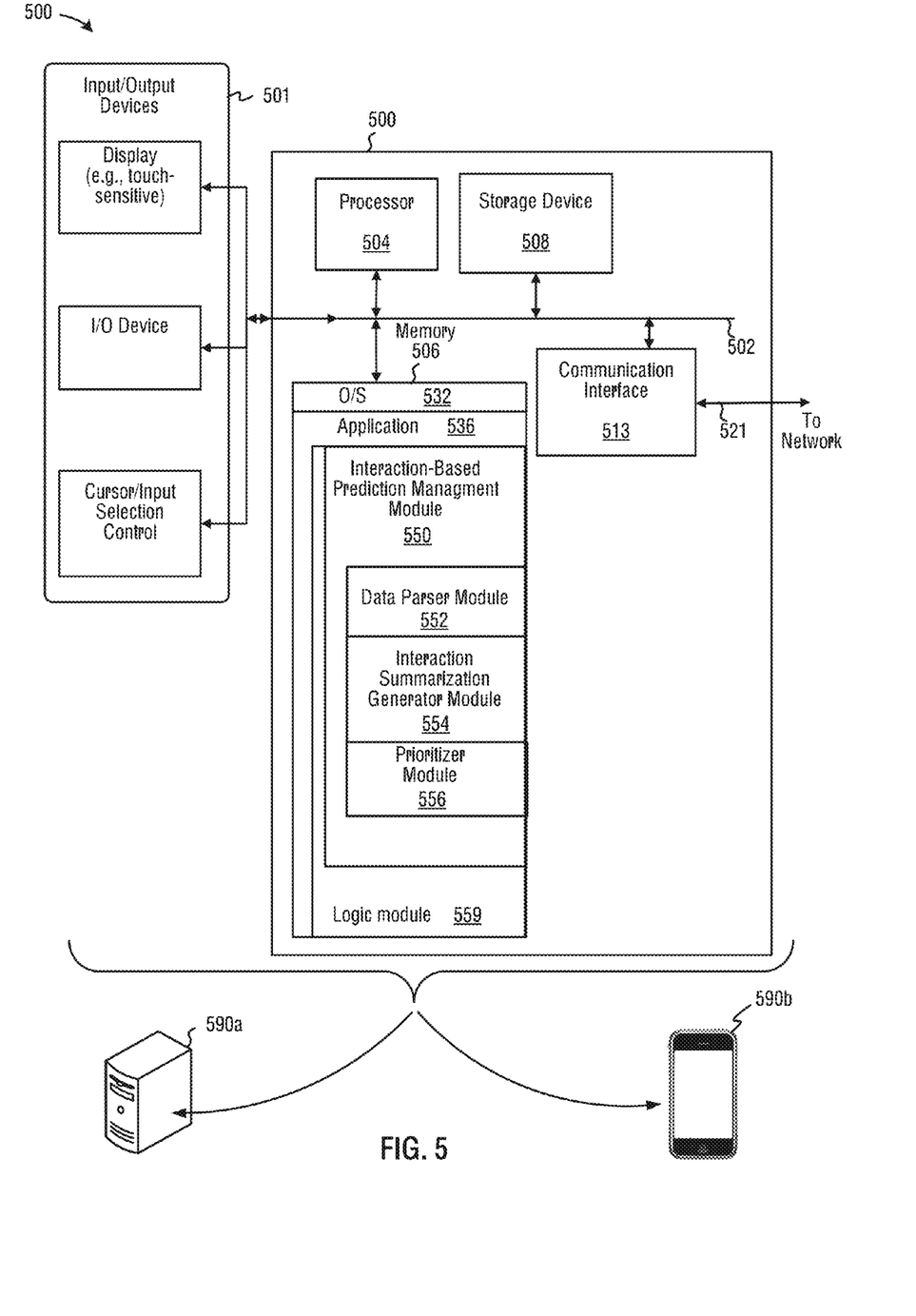
FIG. 5 illustrates an exemplary computing platform disposed in a computing system configured to facilitate changes in direction of travel based on predicted preferential activities and customized advisory data derived from prioritized values of different user interactions in accordance with various embodiments.

FIG. 5 illustrates an exemplary computing platform disposed in a computing system configured to facilitate changes in direction of travel based on predicted preferential activities and customized advisory data derived from prioritized values of different user interactions in accordance with various embodiments. In some examples, computing platform 500 may be used to implement computer programs, applications, methods, processes, algorithms, or other software to perform the above-described techniques.

In some cases, computing platform can be disposed in wearable device or implement, a mobile computing device 590b, or any other device, such as a computing device 590a.

Computing platform 500 includes a bus 502 or other communication mechanism for communicating information, which interconnects subsystems and devices, such as processor 504, system memory 506 (e.g., RAM, etc.), storage device 508 (e.g., ROM, etc.), a communication interface 513 (e.g., an Ethernet or wireless controller, a Bluetooth controller, etc.) to facilitate communications via a port on communication link 521 to communicate, for example, with a computing device, including mobile computing and/or communication devices with processors. Processor 504 can be implemented with one or more central processing units ("CPUs"), such as those manufactured by Intel® Corporation, or one or more virtual processors, as well as any combination of CPUs and virtual processors. Computing platform 500 exchanges data representing inputs and outputs via input-and-output devices 501, including, but not limited to, keyboards, mice, audio inputs (e.g., speech-to-text devices), user interfaces, displays, monitors, cursors, touch-sensitive displays, LCD or LED displays, and other I/O-related devices.

According to some examples, computing platform 500 performs specific operations by processor 504 executing one or more sequences of one or more instructions stored in system memory 506, and computing platform 500 can be implemented in a client-server arrangement, peer-to-peer arrangement, or as any mobile computing device, including smart phones and the like. Such instructions or data may be read into system memory 506 from another computer readable medium, such as storage device 508. In some examples, hard-wired circuitry may be used in place of or in combination with software instructions for implementation. Instructions may be embedded in software or firmware. The term "computer readable medium" refers to any tangible medium that participates in providing instructions to processor 504 for execution. Such a medium may take many forms, including but not limited to, non-volatile media and volatile media. Non-volatile media includes, for example, optical or magnetic disks and the like. Volatile media includes dynamic memory, such as system memory 506.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 502 for transmitting a computer data signal.

In some examples, execution of the sequences of instructions may be performed by computing platform 500. According to some examples, computing platform 500 can be coupled by communication link 521 (e.g., a wired network, such as LAN, PSTN, or any wireless network, including WiFi of various standards and protocols, Blue Tooth®, Zig-Bee, etc.) to any other processor to perform the sequence of instructions in coordination with (or asynchronous to) one another. Computing platform 500 may transmit and receive messages, data, and instructions, including program code (e.g., application code) through communication link 521 and communication interface 513. Received program code may be executed by processor 504 as it is received, and/or stored in memory 506 or other non-volatile storage for later execution.

In the example shown, system memory 506 can include various modules that include executable instructions to implement functionalities described herein. System memory 506 may include an operating system ("O/S") 532, as well as an application 536 and/or logic module(s) 559. In the example shown, system memory 506 includes an interaction-based prediction management module 550 including a data parser module 552, an interaction summarization generator module 554, and a prioritizer module 556, one or more of which can be configured to provide or consume outputs to implement one or more functions described herein.

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, interaction-based prediction management module 550, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with interaction-based prediction management module 550, or one or more of their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figure can represent one or more algorithms. Or, at least one of the elements can represent a portion of logic including a portion of hardware configured to provide constituent structures and/or functionalities.

For example, interaction-based prediction management module 550, or one or more of their components, or any process or device described herein, can be implemented in one or more computing devices (i.e., any mobile computing device, such as a wearable device, an audio device (such as headphones or a headset) or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, interaction-based prediction management module 550, or one or more of their components, or any process or device described herein, can be implemented in one or more computing devices that include one or more circuits. Thus, at least one of the elements in the above-described figures can represent one or more components of hardware. Or, at least one of the elements can represent a portion of logic including a portion of circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any, and/or otherwise distributed among any number of elements.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A method comprising:
    receiving, at a travel application, data representing an interaction with a user interface of a disparate mobile application configured to operate on a mobile computing device, wherein the travel application configured to operate on the mobile computing device receives the data representing the interaction through an application programming interface (API);
    generating data summarizing the interaction to include an interaction type;
    determining data representing a prioritized value based on the interaction type, the prioritized value comprising a quantitative score associated with an interest assigned to the interaction type, the quantitative score adaptively assigned based on a traveler profile associated with the mobile computing device;
    predicting at a processor participation in an activity associated with the interest as a function of the prioritized value; and
    generating customized advisory data comprising a recommendation to perform the activity, the customized advisory data configured to cause presentation of the recommendation on the user interface.

2. The method of claim 1, wherein determining the data representing the prioritized value comprises:
    determining a first subset of interaction types and a second subset of interaction types, wherein the first subset of interaction types have a first plurality of prioritized values greater than a second plurality of prioritized values associated with the second subset of interaction types.

3. The method of claim 2, wherein the first subset of interaction types comprises at least one of submitting a review of the participation of the activity on the disparate mobile application, visiting a location at which the activity occurs, and generating a telephone call through the disparate mobile application to a provider of the activity at the location, the method further comprising:
determining an increase in the first plurality of prioritized values associated with the first subset of interaction types; and
ranking each of the first subset of interaction types based on the traveler profile associated with the mobile computing device and the increase in the first plurality of prioritized values.

4. The method of claim 3, further comprising:
determining a location associated with the activity;
calculating the mobile computing device is co-located with the location of the activity;
identifying the interaction type as a visit to the location; and
assigning a ranking value to data representing the visit to the location.

5. The method of claim 2, wherein the second subset of interaction types comprises at least one of transmitting an electronic message through the disparate mobile application and performing a search of key words associated with the activity via the disparate mobile application comprising a search engine application, the method further comprising:
determining an increase in the second plurality of prioritized values associated with the second subset of interaction types; and
ranking each of the second subset of interaction types based on the traveler profile associated with the mobile computing device and the increase in the second plurality of prioritized values.

6. The method of claim 5, wherein transmitting the electronic message comprises:
transmitting an electronic mail ("email") message or a telephonic text message.

7. The method of claim 1, further comprising:
receiving electronic information responsive to the interaction on the disparate mobile application;
extracting data representing the electronic information;
parsing the data representing the electronic information to identify activity-relevant terms included in the electronic information; and
identifying the activity based on the activity-relevant terms.

8. The method of claim 1, further comprising:
detecting data representing another interaction with the user interface;
determining another prioritized value associated with the another interaction; and
calculating an accumulated prioritized value based on the prioritized value and the another prioritized value.

9. The method of claim 8, wherein predicting the participation in the activity comprises:
predicting at the processor the participation in the activity based on the accumulated prioritized value.

10. The method of claim 1, further comprising:
receiving data representing aggregated traveler interaction data; and
channelizing the customized advisory data based on the aggregated traveler interaction data.

11. The method of claim 1, further comprising:
determining location coordinates associated with the interaction and other interactions; and
using one or more locations based on the location coordinates to form the customized advisory data.

12. A device comprising:
a memory including a travel application comprising one or more modules;
a processor to execute instructions stored in at least one of the modules;
an interaction-based prediction manager configured to receive data representing an interaction with a user interface of a disparate application, wherein the travel application configured to operate on the device receives the data representing the interaction through an application programming interface (API);
an interaction summarization generator configured to generate data summarizing the interaction to include an interaction type;
a prioritizer configured to determine data representing a prioritized value based on the interaction type, the prioritized value comprising a quantitative score associated with an interest assigned to the interaction type, the quantitative score adaptively assigned based on a traveler profile associated with the device;
an instance predictor configured to predict at a processor participation in an activity associated with the interest as a function of the prioritized value; and
a data channelizer configured to generate customized advisory data comprising a recommendation to perform the activity, in accordance to the prioritized value, the customized advisory data configured to cause presentation of the recommendation on the user interface.

13. The device of claim 12, wherein the prioritizer is further configured to:
determine a first subset of interaction types and a second subset of interaction types, the first subset of interaction types having a first plurality of prioritized values greater than a second plurality of prioritized values associated with the second subset of interaction types.

14. The device of claim 12, further comprising:
a data parser configured to receive electronic information responsive to the interaction on the disparate application, to extract data representing the electronic information, to parse the data representing the electronic information to identify activity-relevant terms included in the electronic information, and to identify the activity based on the activity-relevant terms.

15. The device of claim 14, wherein one or more of the interaction-based prediction manager, the interaction summarization generator, the prioritizer, the instance predictor, the data channelizer, and the data parser comprise:
one or more of an interaction-based prediction manager circuit, an interaction summarization generator circuit, a prioritizer circuit, an instance predictor circuit, a data channelizer circuit, and a data parser circuit.

* * * * *